(12) United States Patent
Różewicz et al.

(10) Patent No.: US 12,241,974 B2
(45) Date of Patent: Mar. 4, 2025

(54) METHODS AND SYSTEMS FOR OCCUPANCY STATE DETECTION

(71) Applicant: Aptiv Technologies AG, Schaffhausen (CH)

(72) Inventors: Maciej Różewicz, Cracow (PL); Jakub Porebski, Cracow (PL); Krzysztof Kogut, Cracow (PL)

(73) Assignee: APTIV TECHNOLOGIES AG, Schaffhausen (CH)

( * ) Notice: Subject to any disclaimer, the term of this patent is extended or adjusted under 35 U.S.C. 154(b) by 359 days.

(21) Appl. No.: 17/749,826

(22) Filed: May 20, 2022

(65) Prior Publication Data
US 2022/0381902 A1 Dec. 1, 2022

(30) Foreign Application Priority Data
May 28, 2021 (EP) ..................................... 21176539

(51) Int. Cl.
*G01S 13/931* (2020.01)
*G01S 17/931* (2020.01)
(52) U.S. Cl.
CPC .......... *G01S 13/931* (2013.01); *G01S 17/931* (2020.01)
(58) Field of Classification Search
None
See application file for complete search history.

(56) References Cited

U.S. PATENT DOCUMENTS 10,192,008 B2   1/2019  Tanzmeister
2018/0300561 A1  10/2018 Steyer

OTHER PUBLICATIONS

Erkent, Özgür, et al. "Semantic grid estimation with a hybrid bayesian and deep neural network approach." 2018 IEEE/RSJ International Conference on Intelligent Robots and Systems (IROS). IEEE, 2018. (Year: 2018).*
Steyer, Sascha, Georg Tanzmeister, and Dirk Wollherr. "Grid-based environment estimation using evidential mapping and particle tracking." IEEE Transactions on Intelligent Vehicles 3.3 (2018): 384-396. (Year: 2018).*
Rummelhard, Lukas, Amaury Negre, and Christian Laugier. "Conditional monte carlo dense occupancy tracker." 2015 IEEE 18th International Conference on Intelligent Transportation Systems. IEEE, 2015. (Year: 2015).*

(Continued)

*Primary Examiner* — Raymond L Nimox
(74) *Attorney, Agent, or Firm* — Harness, Dickey & Pierce, P.L.C.

(57) ABSTRACT

A computer-implemented method for occupancy state detection in an area for a pre-determined point in time. In aspects, the computer-implemented method includes operations carried out by computer hardware components. The operations include determining a probability distribution over a list of possible occupancy states of the area at a previous point in time, determining measurement data related to the area at the pre-determined point in time, and determining a probability distribution over the list of possible occupancy states of the area at the pre-determined point in time based on the measurement data and the probability distribution over the list of possible occupancy states of the area at the previous point in time.

20 Claims, 4 Drawing Sheets

(56) References Cited

OTHER PUBLICATIONS

Diehl, Christopher, et al. "Radar-based dynamic occupancy grid mapping and object detection." 2020 IEEE 23rd International Conference on Intelligent Transportation Systems (ITSC). IEEE, 2020. (Year: 2020).*
"Extended European Search Report", EP Application No. 21176539.1, Nov. 22, 2021, 10 pages.
Dadhich, et al., "Modeling occupancy grids using EDHMM for dynamic environments", Jul. 2015, 6 pages.
Elfes, "Using Occupancy Grids for Mobile Robot Perscription and Navigation", Jun. 1989, pp. 46-57.
Erkent, "Semantic Grid Estimation with a Hybrid Bayesian and Deep Neural Network Approach", Sep. 25, 2018, 9 pages.
Rapp, et al., "Hidden Markov Model-based Occupancy Grid Maps of Dynamic Environments", Jul. 2016, 9 pages.
Song et al., "2D LiDAR Map Prediction via Estimating Motion Flow with GRU", Feb. 19, 2019, 7 pages.

* cited by examiner

METHODS AND SYSTEMS FOR OCCUPANCY STATE DETECTION

CROSS-REFERENCE TO RELATED APPLICATION(S)

This application claims priority to European Patent Application Number 21176539.1, filed May 28, 2021, the disclosure of which is hereby incorporated by reference in its entirety herein.

BACKGROUND

Various sensors such as radar sensors or light detection and ranging (LIDAR) sensors may be used in automotive applications to monitor the environment of a vehicle. In the environment of the vehicle an area may be occupied by different objects, such as other vehicles, pedestrians, barriers or the like, which may influence safety and reliability of driver assistant systems. Thus, it may be desired to know whether the area is occupied and if so, which occupancy state is valid for that area. However, reliable occupancy state detection suffers from complexity and high computational effort.

SUMMARY

The present disclosure provides a computer-implemented method, a system, and a non-transitory computer readable medium for occupancy state detection. In one aspect, the present disclosure is directed at a computer-implemented method for occupancy state detection in an area for a pre-determined point in time. The computer-implemented may comprise operations performed (e.g., carried out) by computer hardware components: determining a probability distribution over a list of possible occupancy states of the area at a previous point in time; determining measurement data related to the area at the pre-determined point in time; and determining a probability distribution over the list of possible occupancy states of the area at the pre-determined point in time based on the measurement data and the probability distribution over the list of possible occupancy states of the area at the previous point in time. The list of possible occupancy states comprises a static occupancy state, a dynamic occupancy state, a free-space state, a first uncertainty state between the static occupancy state and the dynamic occupancy state, a second uncertainty state between the static occupancy state and the free-space state, a third uncertainty state between the dynamic occupancy state and the free-space state, and an unknown occupancy state.

For example, the probability distribution at the previous point in time of the area is determined over the list of defined possible occupancy states, i.e. states that for example describe whether an object is present in the area. The previous point in time may be immediately before the pre-determined time (e.g., no further point in time is between the previous point in time and the pre-determined point in time). It may be understood that a discrete sequence of points in time may be used, for example equidistant points in time, for example a point in time every pre-determined amount of seconds, for example every second, or every ¹⁄₁₀ of a second (e.g., 100 ms), or the like. The pre-determined point in time may be a current point in time or an arbitrary point in time. The pre-determined point in time may directly follow after the previous point in time (e.g., no further point in time is between the pre-determined point in time and the previous point in time). Additionally, measurement data at the pre-determined point in time of the area may be measured by a sensor. The sensor may be or may include a radar sensor and/or a LIDAR sensor. The probability distribution at the pre-determined point in time of the area may be determined over the list of defined possible occupancy states, wherein the probability distribution at the pre-determined point in time of the area may be dependent on the probability distribution at the previous point in time of the area and the measurement data at the pre-determined point in time of the area.

The area may be an environment of a robot or a vehicle. The area may be of variable size or the area may be a specific area (or sector) of interest, for example in front of the robot or the vehicle.

Occupancy state detection in the area may be understood as a combination of object detection and estimation of a possible state of the object. For example, if there is an object detected in the area, then the area may be defined as occupied. Otherwise, if the area is not occupied, the area may be defined as free-space. If the area is occupied, the object in the area may have one possible state, i.e. one occupancy state. The occupancy state may be one of the defined possible occupancy states from the list of possible occupancy states as described herein. The static occupancy state may describe a state wherein the occupancy state may be in a steady state or a quasi-steady state, i.e. the occupancy state may remain constant with respect to time (e.g., objects with the static occupancy state do not move with respect to time). The dynamic occupancy state may describe a state wherein the occupancy state may have a changing behavior with respect to time (e.g., objects with the dynamic occupancy state may move with respect to time). Thus, the difference between the static occupancy state and the dynamic occupancy state may be on the behavior of the respective occupancy state with respect to time. For each of the uncertainty states described in the list of possible occupancy states, it may not be clear which of the respective two possible occupancy states the object has. For the unknown occupancy state, it may not be known whether the area is occupied or a free-space.

The probability distribution may provide a probability for each of the states. The probabilities over all probabilities may sum up to 1 (e.g., 100%), or the probabilities may sum up to any different value, so that the respective probability does not provide a probability as such, but the relative values of the respective probabilities of the states provide information about which state is more likely than another.

According to an implementation, the probability distribution over the list of possible occupancy states of the area at the previous point in time comprises a pre-determined initial state distribution over the list of possible occupancy states of the area.

According to an implementation, the initial state distribution over the list of possible occupancy states of the area comprises an equal distribution over the list of possible occupancy states of the area.

The equal distribution over the list of possible occupancy states of the area means that the possibility of each of the possible states in the initial state is the same.

According to an implementation, the probability distribution over the list of possible occupancy states of the area at the previous point in time is determined based on measurement data related to the area at the previous point in time and a probability distribution over the list of possible occupancy states of the area at a further point in time preceding the previous point in time.

For example: the probability distribution at the previous point in time of the area is determined over the list of defined possible occupancy states, wherein the probability distribution at the previous point in time of the area is dependent on the probability distribution at the further previous point in time of the area and the measurement data at the previous point in time of the area.

The further point in time may be immediately before the previous point in time (e.g., no other further point in time is between the further point in time and the previous point in time). The previous point in time may directly follow after the further point in time (e.g., no another further point in time is between the previous point in time in time and the further point in time).

There may be a plurality of further points in time preceding the further point in time. The determination of a probability distribution at the further points in time of the area may then be carried out similar to the determination of the probability distribution at the pre-determined point in time or the determination of the probability distribution at the previous point in time.

According to an implementation, the probability distribution over the list of possible occupancy states of the area at the pre-determined point in time is determined further based on a transition matrix comprising a plurality of state transition probabilities between possibly occupancy states.

The transition matrix may be a transition matrix of a Markov model, and the method according to various implementations may be carried out according to the Markov model.

The transition matrix may indicate probabilities of state transitions under the assumption that no sensor data is available.

The plurality of state transition probabilities may be a respective state transition probability from each of a first occupancy state of the possible occupancy states to a second occupancy state of the possible occupancy states. The first occupancy state may be identical to second occupancy state or the first occupancy state may be different from second occupancy state.

According to an implementation, the following state transition probabilities are different from zero: a state transition probability from the static occupancy state into the static occupancy state; a state transition probability from the static occupancy state into the first uncertainty state between the static occupancy state and the dynamic occupancy state; a state transition probability from the static occupancy state into the second uncertainty state between the static occupancy state and the free-space state; a state transition probability from the dynamic occupancy state into the dynamic occupancy state; a state transition probability from the dynamic occupancy state into the first uncertainty state between the static occupancy state and the dynamic occupancy state; a state transition probability from the dynamic occupancy state into the third uncertainty state between the dynamic occupancy state and the free-space state; a state transition probability from the free-space state into the free-space state; a state transition probability from the free-space state into the second uncertainty state between the static occupancy state and the free-space state; a state transition probability from the free-space state into the third uncertainty state between the dynamic occupancy state and the free-space state; a state transition probability from the first uncertainty state between the static occupancy state and the dynamic occupancy state into the first uncertainty state between the static occupancy state and the dynamic occupancy state; a state transition probability from the first uncertainty state between the static occupancy state and the dynamic occupancy state into the unknown occupancy state; a state transition probability from the second uncertainty state between the static occupancy state and the free-space state into the second uncertainty state between the static occupancy state and the free-space state; a state transition probability from the second uncertainty state between the static occupancy state and the free-space state into the unknown occupancy state; a state transition probability from the third uncertainty state between the dynamic occupancy state and the free-space state into third uncertainty state between the dynamic occupancy state and the free-space state; a state transition probability from the third uncertainty state between the dynamic occupancy state and the free-space state into the unknown occupancy state; a state transition probability from the unknown occupancy state into the unknown occupancy state (which may be equal to 1).

All other possible state transition probabilities may be zero, i.e. a state transition probability from the static occupancy state into the dynamic occupancy state or into the free-space state or into the third uncertainty state between the dynamic occupancy state and the free-space state or into the unknown occupancy state; a state transition probability from the dynamic occupancy state into the static occupancy state or into the free-space state or into the second uncertainty state between the static occupancy state and the free-space state or into the unknown occupancy state; a state transition probability from the free-space state into the static occupancy state or into the dynamic occupancy state or into the first uncertainty state between the static occupancy state and the dynamic occupancy state or into the unknown occupancy state; a state transition probability from the first uncertainty state between the static occupancy state and the dynamic occupancy state into the static occupancy state or into the dynamic occupancy state or into the free-space state or into the second uncertainty state between the static occupancy state and the free-space state or the third uncertainty state between the dynamic occupancy state and the free-space state; a state transition probability from the second uncertainty state between the static occupancy state and the free-space state into the static occupancy state or into the dynamic occupancy state or into the free-space state or into the first uncertainty state between the static occupancy state and the dynamic occupancy state or into the third uncertainty state between the dynamic occupancy state and the free-space state; a state transition probability from the third uncertainty state between the dynamic occupancy state and the free-space state into the static occupancy state or into the dynamic occupancy state or into the free-space state or into the first uncertainty state between the static occupancy state and the dynamic occupancy state or into the second uncertainty state between the static occupancy state and the free-space state; a transition from the unknown occupancy state into the static occupancy state or into the dynamic occupancy state or into the free-space state or into the first uncertainty state between the static occupancy state and the dynamic occupancy state or into the second uncertainty state between the static occupancy state and the free-space state or into the third uncertainty state between the dynamic occupancy state and the free-space state.

For example, there may be no state transition probability between the static occupancy state and the dynamic occupancy state and the free-space state and the unknown occupancy state directly. There may be no state transition probability between the static occupancy state or the dynamic occupancy state or the free-space state into an uncertainty state, wherein the uncertainty state is not between the respective static occupancy state or not between the respective dynamic occupancy state or not between the respective free-space state and the static occupancy state or the dynamic occupancy state or the free-space state. There may be no state transition probability from an uncertainty state back to the static occupancy state or the dynamic occupancy state or the free-space state. There may be no state transition probability from the unknown occupancy state into any other possible state, except the unknown occupancy state itself.

According to an implementation, the transition matrix is dependent of an estimated velocity of an object in the area.

The estimated velocity of an object in the area may also be referred to as estimated cell velocity.

According to an implementation, the probability distribution over the list of possible occupancy states of the area at the pre-determined point in time is determined further based on an observation matrix comprising observation emission probabilities.

The observation matrix may be an observation matrix of a Markov model, and the method according to various implementations may be carried out according to the Markov model. The observation matrix may introduce sensor data to the method.

The observation emission probabilities may be a respective observation emission probability from each of a probability distribution over the list of possible occupancy states of the area at the pre-determined point in time to an observation state over a list of possible observation states. The list of possible observation states may be dependent of the sensor, used for the observation.

According to an implementation, the area comprises a cell of an occupancy grid, the occupancy grid comprising a plurality of further cells. For example, the area may be represented by a cell, wherein the plurality of cells may represent the occupancy grid. Each of the further cells represents a respective further area. The method described herein may (also) be carried out for each of the further cells (e.g., for the further areas). The cell and each of the further cells may be in one of the possible states, and the states may be different for different cells.

According to an implementation, the measurement data is determined based on a LIDAR sensor and the measurement data comprises an uncertainty information between a static occupancy and a dynamic occupancy or a free-space information.

The LIDAR sensor may measure a range or a distance between the sensor and a vehicle or an object. Measurement data from a LIDAR sensor may also comprise an azimuth and an elevation angle of a vehicle or an object relatively to the sensor. The measurement data recorded from the LIDAR sensor may be very detailed and may include fine and accurate information about objects at a great distance. Ambient lighting may not influence the quality of the captured information by LIDAR, thus the results at day and night may be without any loss of performance due to disturbances such as shadows, sunlight or headlight glare.

According to an implementation, the measurement data is determined based on a radar sensor and the measurement data comprises a static occupancy information, a dynamic occupancy information, an uncertainty information between a static occupancy and a dynamic occupancy, or a free-space information.

Radar sensors may be impervious to adverse or bad weather conditions, working reliably in dark, wet, or even foggy weather. Radar sensors may be able to identify a distance, a direction and a relative speed of vehicles or objects. The direction may be determined by the azimuth and elevation, wherein the azimuth and elevation may be measured by radar sensors.

According to an implementation, the observation matrix is dependent on at least one of a detection range rate from the radar sensor and a distance from the radar sensor. The range rate may be the velocity, i.e. the relative speed. The range rate may describe the rate that a vehicle or object moves toward or away from the radar sensor.

In another aspect, the present disclosure may be directed at a computer system, said computer system comprising a plurality of computer hardware components configured to carry out several or all operations of the computer-implemented method described herein.

The computer system may comprise a plurality of computer hardware components (for example a processor, for example processing unit or processing network, at least one memory, for example memory unit or memory network, and at least one non-transitory data storage). It may be understood that further computer hardware components may be provided and used for carrying out operations of the computer-implemented method in the computer system. The non-transitory data storage and/or the memory unit may comprise a computer program for instructing the computer to perform several or all operations or aspects of the computer-implemented method described herein, for example using the processing unit and the at least one memory unit.

In another aspect, the present disclosure is directed to a vehicle, comprising the computer system described herein and a sensor, wherein the measurement data is determined based on an output of the sensor. The sensor may be a radar system and/or a LIDAR system.

The vehicle can be a car, a truck or a motorcycle and the sensor may be mounted on the vehicle. The sensor may be directed to an area in front or in the rear or at a side of the vehicle. Measurement data may be captured by the sensor when the vehicle is moving.

In another aspect, the present disclosure is directed at a non-transitory computer readable medium comprising instructions for carrying out several or all operations or aspects of the computer-implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all operations or aspects of the computer-implemented method described herein.

With the methods and system described herein, hidden Markov models may be used as a method for dynamic and static occupancy discrimination in an occupancy grid method framework. For example, each cell of the occupancy grid may be treated separately by defining the possible states and transitions of each cell and modelling the sensor data observation matrix.

BRIEF DESCRIPTION OF THE DRAWINGS

Exemplary implementations and functions of the present disclosure are described herein in conjunction with the following drawings, showing schematically.

DETAILED DESCRIPTION

Occupancy state detection of objects or the like may be used in different technical fields. For instance, path planning and collision avoidance in robotic applications or object detection for driving assistance systems in the automotive industry may use methods and systems based on occupancy state detection.

The environment of a robot or a vehicle for example may comprehend a plurality of different objects or the like with different states, for example a static state for buildings, trees or the like, a dynamic state for driving vehicles and moving pedestrians or the like or even an unknown state if it is not recognizable or measurable what the object or the like behavior is. To detect the different states of the objects, the environment of the robot, the vehicle or the like may be divided by means of a grid into an evenly spaced field of a plurality of cells. Each cell of the grid may represent the presence of an obstacle, an object, a part of an obstacle or a part of an object at that location in the environment by a binary random variable. For each of this cells or sections, an occupancy state may be estimated that may specify whether the cell is occupied. This method may be referred to as an occupancy grid mapping. Occupancy grid methods may compute approximate posterior estimates for these random variables.

For example, an occupancy grid mapping refers to a family of methods in probabilistic robotics for mobile robots or vehicles for example which address the problem of generating maps from noisy and uncertain sensor measurement data, with the assumption that the robot pose or vehicle position is known.

For a reliable detection of occupancy states in dynamic environments, a robust model may be useful to obtain an accurate occupancy state estimation. For example, Markov chain model-based approaches may be used. A Markov chain model may predict that the probability of switching from a current state may not vary as a function of previous states. In probability theory, a Markov model may be a stochastic model used to model pseudo-randomly changing systems. It may be assumed that future states depend only on the current state, not on the events that occurred before it (e.g., it assumes the Markov property). This assumption may enable reasoning and computation with the model that may otherwise be intractable. For this reason, in the fields of predictive modelling and probabilistic forecasting, it may be desirable for a given model to exhibit the Markov property.

An enhancement of the Markov chain method may be a Hidden Markov Model (HMM). HMM may be a statistical Markov Model in which a modeled system may be assumed to be a Markov process X with unobservable ("hidden") occupancy states. HMM may assume that there may be another process, an observation, Y whose behavior depends (probabilistically) on the process X. The main idea of HMM method may be to extract information about the process X by observing the process Y.

The Hidden Markov Model (HMM) may use occupancy grid maps created at different discrete time steps (t=0, 1, 2, . . . ) as observations. At each discrete time step t, the system may be in some internal ("hidden") occupancy state ht and a measurement (which may also be referred to as an observation) mt may be emitted based only on ht. The system may transit to a new occupancy state ht+1 from time step t to time step t+1, and the process may repeat. This may be called Markov Chain and is presented graphically in FIG. 1.

Figure 1:
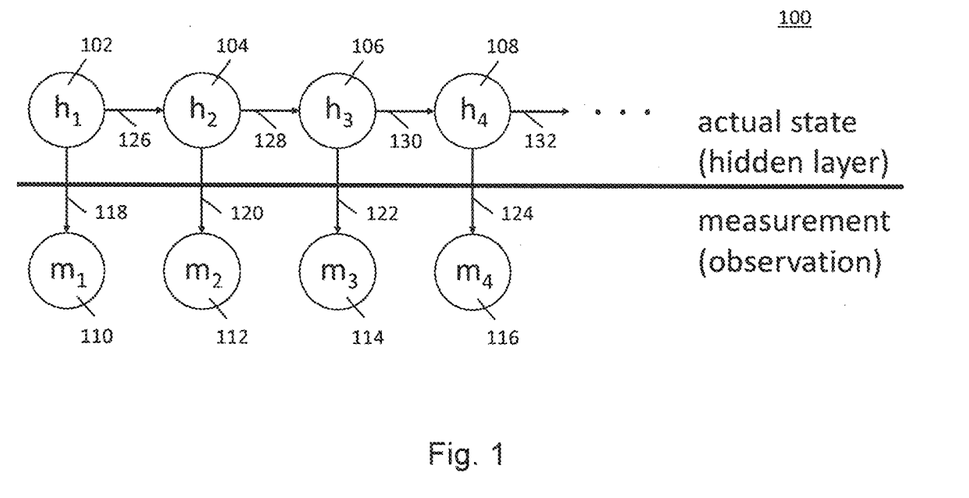
FIG. 1 illustrates a graphical representation of a Markov Chain.

FIG. 1 illustrates a graphical representation of a Markov Chain 100. FIG. 1 is divided into two sections by a bold line, wherein the area above the bold line shows an actual state (which may also be referred to as a hidden layer) and the area below the bold line illustrates a measurement (which may also be referred to as an observation). The actual state comprises a plurality of occupancy states h1 102, h2 104, h3 106, h4 108 at discrete time steps t that are connected in a way that the occupancy state of a point in time depends on the occupancy state of a previous point in time, i.e. the point in time of the previous point in time is directly before the point in time. The connections between the occupancy states are represented by arrows q12 126, q23 128, q34 130 and q45 132 that indicate the transition from the occupancy state ht−1 at the previous point in time t−1 to the occupancy state ht at the present point in time. For example, the arrow q34 130 connects the occupancy state h3 106 with the occupancy state h4 108. Furthermore, each of the occupancy states h1 102, h2 104, h3 106, h4 108 in the upper part of FIG. 1 is connected to a corresponding measurement m1 110, m2 112, m3 114, m4 116 in the lower part of FIG. 1 by an arrow. The arrows b1 118, b2 120, b3 122 and b4 124 indicate that the measurement mt occurs if the occupancy state ht is present.

To apply the Hidden Markov Model (HMM) framework, some variables and operators may be defined beforehand. A list of possible occupancy states $\Omega$ may be assumed to be finite. The list of occupancy states $\Omega$ may consist of {S, D, F, SD, SF, DF, SDF}, wherein the occupancy states may be defined as a static occupancy state S, a dynamic occupancy state D, a free-space state F, a first uncertainty state SD between the static occupancy state S and the dynamic occupancy state D, a second uncertainty state SF between the static occupancy state S and the free-space state F, a third uncertainty state DF between the dynamic occupancy state D and the free-space state F, and an unknown occupancy state SDF.

An initial state distribution $p(\Omega 1=\omega)$, $\forall \omega \in \Omega$ over the list of possible occupancy states of the area may be pre-determined. State transition probabilities $p_{ij}(\Omega t+1=\omega'|\Omega t=\omega)$, $\forall \omega, \omega' \in \Omega$ may be defined that indicate how likely it is that the occupancy state $\omega'$ occurs if the previous occupancy state $\omega$ was present. These annotate the right-going arcs in FIG. 2.

A set of observations O may be assumed to be finite. The observation emission probabilities $b(Ot=o|\Omega t=\omega)$, $\forall \omega \in \Omega$, $o \in O$ may indicate how likely it is that the observation o occurs if the occupancy state w is present. These annotate the down-going arcs in FIG. 2.

If $\Omega$ and O are finite, the initial state distribution p may be represented as a vector p of size $|\Omega|$.

Figure 2:
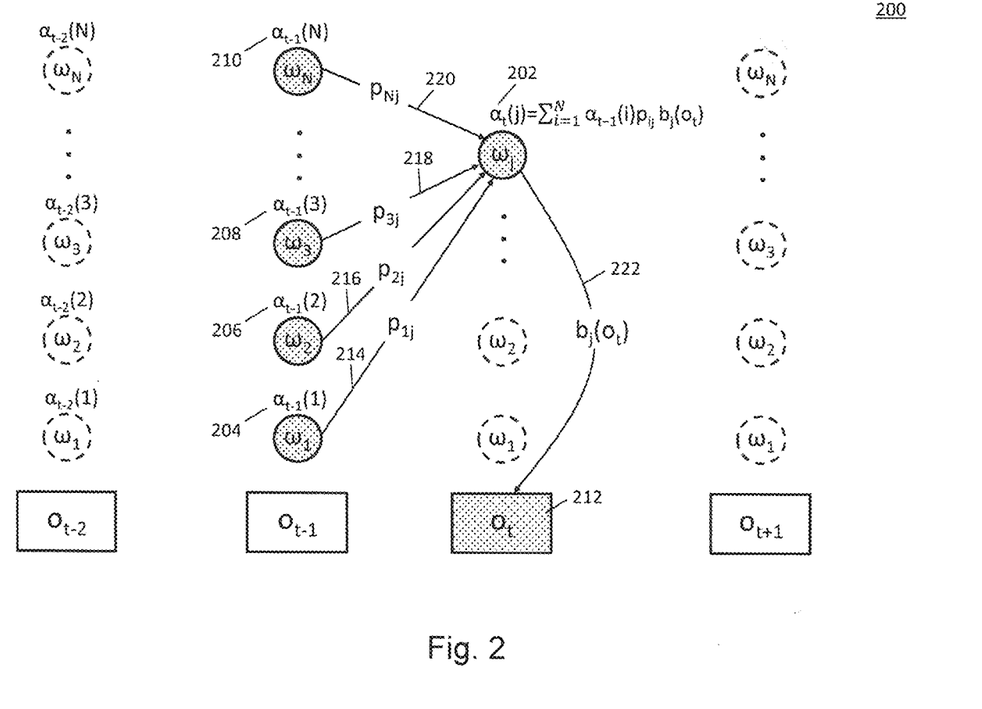
FIG. 2 illustrates a visualization of the computation of a single probability distribution.

FIG. 2 illustrates a visualization of the computation of a single probability distribution. As illustrated in FIG. 2, the state transition probabilities $p_{ij}$ may indicate how likely it is that the occupancy state ωj at a present point in time t occurs if the occupancy state ωi was present at a previous point in time t−1.

The transition probabilities form a transition matrix P of size |Ω|×|Ω|, wherein each row i is the multinomial of the next state given that the current state is i. Similarly, the observation emission probabilities form an observation matrix Q of size |Ω|×|O|, wherein each row i is a multinomial distribution over the observations, given the occupancy state.

Together b0, P and Q may form the model of the HMM.

Forward calculation of a j-th occupancy state probability αt(j) may be done in each operation by the formula:

$$a_t(j) = \sum_{i=1}^{|\Omega|} a_{t-1}(i) p_{i \to j} b_j(O_t)$$

FIG. 2 illustrates a visualization of the computation of a single probability distribution 200. The computation may be performed by a computer-implemented method for occupancy state detection in an area for a pre-determined point in time t. The following operations carried out by computer hardware components: determining a probability distribution αt−1(1) 204, αt−1(2) 206, αt−1(3) 208 till αt−1(N) 210 over a list of possible occupancy states of the area at a previous point in time t−1; determining measurement data (e.g., observation) ot 212 related to the area at the pre-determined point in time t; and determining a probability distribution At(j) 202 over the list of possible occupancy states of the area at the pre-determined point in time t based on the measurement data ot 212 and the probability distribution αt−1(1) 204, αt−1(2) 206, αt−1(3) 208 till αt−1(N) 210 over the list of possible occupancy states of the area at the previous point in time.

For example: the j-th probability distribution αt(j) 202 at a pre-determined point in time t may be calculated by summing up all previous probability distributions αt−1(1) 204, αt−1(2) 206, αt−1(3) 208 till αt−1(N) 210 in a previous point in time t−1, weighted by their state transition probabilities p1j 214, p2j 216, p3j 218 and pNj 220 and further multiplied by the observation emission probability bj(ot) 222, wherein ot 212 is the observation at the pre-determined point in time t.

The area may be represented by a cell, wherein the plurality of cells may represent the occupancy grid. Each of the plurality of cells from the occupancy grid may be treated as a separate system. The operations of the method described above may be performed in each of the plurality of cells from the occupancy grid. Each of the plurality of cells from the occupancy grid may be observed by a radar sensor or a LIDAR sensor.

Figure 3:
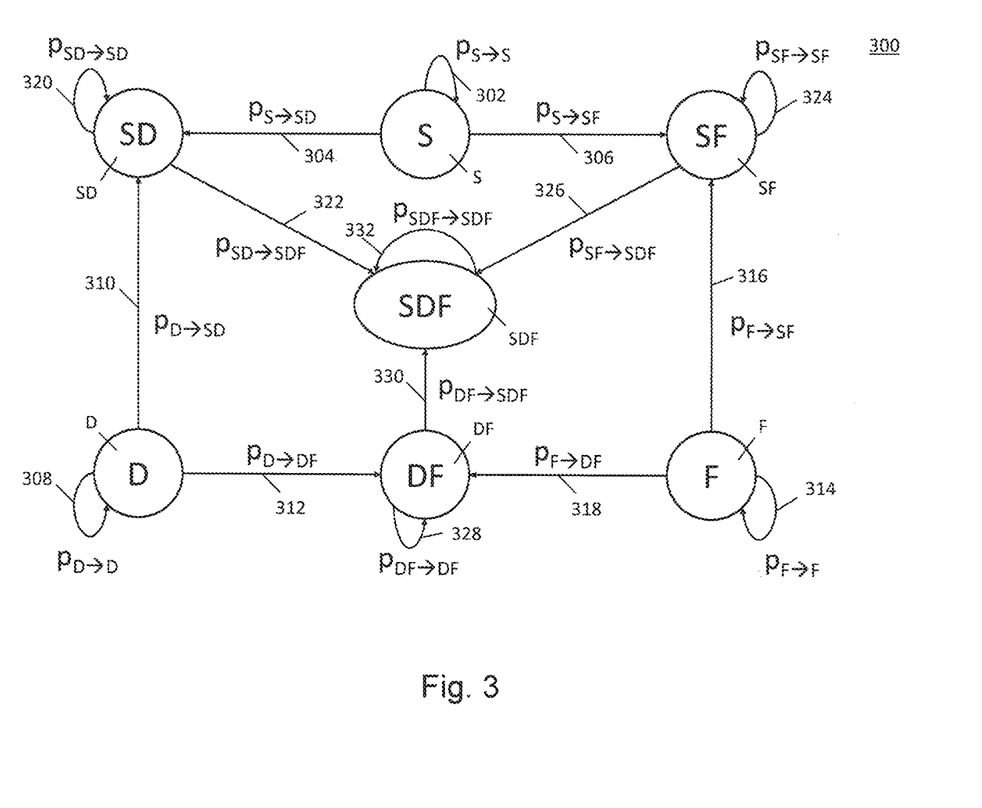
FIG. 3 illustrates a state transition graph.

If the list of possible occupancy states Ω is finite and defined for example as Ω={S, D, F, SD, SF, DF, SDF}, then the possible transitions between occupancy states may be presented graphically in form of a graph. FIG. 3 illustrates a state transition graph 300. The possible occupancy states Ω may be defined as described herein, i.e. a static occupancy state S, a dynamic occupancy state D, a free-space state F, a first uncertainty state SD between the static occupancy state S and the dynamic occupancy state D, a second uncertainty state SF between the static occupancy state S and the free-space state F, a third uncertainty state DF between the dynamic occupancy state D and the free-space state F and an unknown occupancy state SDF. The possible occupancy states are connected by a plurality of arrows which represents a plurality of state transition probabilities between possibly occupancy states. Those state transition probabilities between possibly occupancy states may be defined as presented in the following transition matrix P:

$$P = \begin{bmatrix} p_{S \to S} & 0 & 0 & 0 & 0 & 0 & 0 \\ 0 & p_{D \to D} & 0 & 0 & 0 & 0 & 0 \\ 0 & 0 & p_{F \to F} & 0 & 0 & 0 & 0 \\ p_{S \to SD} & p_{D \to SD} & 0 & p_{SD \to SD} & 0 & 0 & 0 \\ p_{S \to SF} & 0 & p_{F \to SF} & 0 & p_{SF \to SF} & 0 & 0 \\ 0 & p_{D \to DF} & p_{F \to DF} & 0 & 0 & p_{DF \to DF} & 0 \\ 0 & 0 & 0 & p_{SD \to SDF} & p_{SF \to SDF} & p_{DF \to SDF} & 1 \end{bmatrix}$$

The probabilities provided in the transition matrix P can be treated as equivalent of a decay or a forgetting factor (which may provide that without measurement data, the knowledge of the states may decay or may be forgotten).

As shown in the formula above, the following state transition probabilities are different from zero and defined as: a state transition probability pS→S 302 from the static occupancy state S into the static occupancy state S, a state transition probability pS→SD 304 from the static occupancy state S into the first uncertainty state SD between the static occupancy state S and the dynamic occupancy state D, a state transition probability pS→SF 306 from the static occupancy state S into the second uncertainty state SF between the static occupancy state S and the free-space state F, a state transition probability pD→D 308 from the dynamic occupancy state D into the dynamic occupancy state D, a state transition probability pD→SD 310 from the dynamic occupancy state D into the first uncertainty state SD between the static occupancy state S and the dynamic occupancy state D, a state transition probability pD→DF 312 from the dynamic occupancy state D into the third uncertainty state DF between the dynamic occupancy state D and the free-space state F, a state transition probability pF→F 314 from the free-space state F into the free-space state F, a state transition probability pF→SF 316 from the free-space state F into the second uncertainty state SF between the static occupancy state S and the free-space state F, a state transition probability pF→DF 318 from the free-space state F into the third uncertainty state DF between the dynamic occupancy state D and the free-space state F, a state transition probability pSD→SD 320 from the first uncertainty state SD between the static occupancy state S and the dynamic occupancy state D into the first uncertainty state SD between the static occupancy state S and the dynamic occupancy state D, a state transition probability pSD→SDF 322 from the first uncertainty state SD between the static occupancy state S and the dynamic occupancy state D into the unknown occupancy state SDF, a state transition probability pSF→SF 324 from the second uncertainty state SF between the static occupancy state S and the free-space state F into the second uncertainty state SF between the static occupancy state S and the free-space state F, a state transition probability pSF→SDF 326 from the second uncertainty state SF between the static occupancy state S and the free-space state F into the unknown occupancy state SDF, a state transition probability pDF→DF 328 from the third uncertainty state DF between the dynamic occupancy state D and the free-space state F into third uncertainty state DF between the dynamic occupancy state D and the free-space state F, a state transition probability pDF→SDF 330 from the third uncertainty state DF between the dynamic occupancy state D and the free-space state F into the unknown occupancy state SDF and a state transition probability pSDF→SDF 332 from the unknown occupancy state SDF into the unknown occupancy state SDF, wherein the state transition probability pSDF→SDF 332 is equal to 1. All other entries are zero, i.e. the state transition probability is zero, so there is no state transition probability between the corresponding states.

For all of the described state transition probabilities which may be different from zero, the following conditions are met:

$$\sum_{i \in \Omega} p_{S \to i} = 1, \sum_{i \in \Omega} p_{D \to i} = 1, \sum_{i \in \Omega} p_{F \to i} = 1$$

$$\sum_{i \in \Omega} p_{SD \to i} = 1, \sum_{i \in \Omega} p_{SF \to i} = 1, \sum_{i \in \Omega} p_{DF \to i} = 1$$

If these conditions are met, then it can be shown that after an infinite number of operations without measurement update, the unknown occupancy state SDF may be reached, which is a desired behavior. For example, after an infinite number of iterations (number of iterations n→∞) in which only the transition matrix P is applied without measurement update, all state transition probabilities concentrate in the unknown occupancy state SDF. In yet other words, in the "infinite power" of the transition matrix P, the state transition probabilities from any occupancy state to the unknown occupancy state SDF is 1 and all other state transition probabilities are set to 0:

$$\lim_{n \to \infty} p^n = \begin{bmatrix} 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 1 & 1 & 1 & 1 & 1 & 1 & 1 \end{bmatrix}$$

The transition matrix P may be dependent of an estimated velocity v of an object in the area (P=P(v)) if it is calculated. Such parametrization may provide a better occupancy state prediction of the area.

Radar sensors and LIDAR sensors may have different characteristics of possible information available for detection, which may lead to different observation sets for radar sensors and LIDAR sensors. The set of observations for a radar sensor may be defined as Oradar={S, D, SD, F} and the set of observations for a LIDAR sensor may be defined as OLIDAR={SD, F}, wherein the abbreviations have the same meaning as described herein, i.e. a static occupancy state S, a dynamic occupancy state D, a free-space state F and a first uncertainty state SD between the static occupancy state S and the dynamic occupancy state D.

This may mean that based on LIDAR sensors only an uncertainty information between a static occupancy and a dynamic occupancy or a free-space information (in ray-casting mode) may be deduced, without a discrimination between a static occupancy state S and a dynamic occupancy state D. Ray-casting mode may be an inverse sensor model calibration, which may model not only an area of occupancy, but also a free-space between the areas of occupancy. In this mode free-space is modelled in cells under ray between sensor origin and detection. The inverse sensor model enables to estimate occupied and empty regions, given sensor measurements. Based on radar sensors detection, information about a static occupancy information and a dynamic occupancy information may be extracted, if detection can be classified as dynamic or static. Otherwise only an uncertainty information between a static occupancy and a dynamic occupancy or a free-space information (in ray-casting mode) may be obtained from detection. For the method described herein, there may not be used a pre-filtering of the sensor information. For example, the method described herein may work even without pre-filtering of the sensor information.

For each sensor, i.e. for radar sensors and for LIDAR sensors, an observation matrix Qradar and an observation matrix QLIDAR may be defined. The observation emission probability q added to each entry of the observation matrix Qradar may be dependent on a distance r from detection to the radar sensor, same as "classic" inverse sensor model (ISM), and a detection range rate t. Based on these values, a discrimination between a static occupancy state S and a dynamic occupancy state D can be done:

$$Q_{radar}(\hat{r}, r) = \begin{bmatrix} q_{S \to S} & q_{D \to S} & q_{SD \to S} & q_{F \to S} \\ q_{S \to D} & q_{D \to D} & q_{SD \to D} & q_{F \to D} \\ q_{S \to F} & q_{D \to F} & q_{SD \to F} & q_{F \to F} \\ q_{S \to SD} & q_{D \to SD} & q_{SD \to SD} & q_{F \to SD} \\ q_{S \to SF} & q_{D \to SF} & q_{SD \to SF} & q_{F \to SF} \\ q_{S \to DF} & q_{D \to DF} & q_{SD \to DF} & q_{F \to DF} \\ q_{S \to SDF} & q_{D \to SDF} & q_{SD \to SDF} & q_{F \to SDF} \end{bmatrix}$$

The observation matrix QLIDAR may be dependent on the distance r from the LIDAR sensor:

$$Q_{LiDAR}(r) = \begin{bmatrix} q_{SD \to S} & q_{F \to S} \\ q_{SD \to D} & q_{F \to D} \\ q_{SD \to F} & q_{F \to F} \\ q_{SD \to SD} & q_{F \to SD} \\ q_{SD \to SF} & q_{F \to SF} \\ q_{SD \to DF} & q_{F \to DF} \\ q_{SD \to SDF} & q_{F \to SDF} \end{bmatrix}$$

Figure 4:
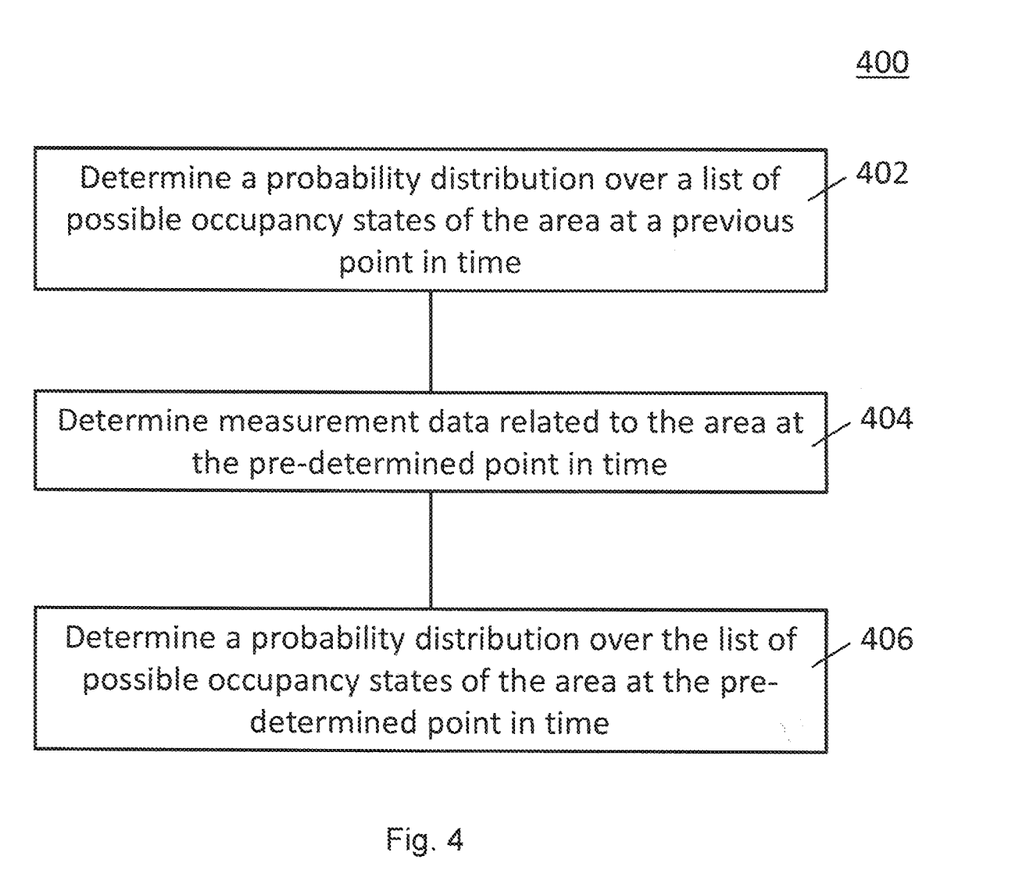
FIG. 4 illustrates a method for occupancy state detection according to various implementations.

FIG. 4 illustrates a method for occupancy state detection according to various implementations. As illustrated, a flow diagram 400 depicts a method for occupancy state detection according to various implementations. At 402, a probability distribution over a list of possible occupancy states of the area at a previous point in time may be determined. At 404, measurement data related to the area at the pre-determined point in time may be determined. At 406, a probability distribution over the list of possible occupancy states of the area at the pre-determined point in time may be determined, based on the measurement data and the probability distribution over the list of possible occupancy states of the area at the previous point in time wherein the list of possible occupancy states comprises: a static occupancy state S, a dynamic occupancy state D, a free-space state F, a first uncertainty state SD between the static occupancy state S and the dynamic occupancy state D, a second uncertainty state SF between the static occupancy state S and the free-space state F, a third uncertainty state DF between the dynamic occupancy state D and the free-space state F, and an unknown occupancy state SDF.

According to various implementations, the probability distribution over the list of possible occupancy states of the area at the previous point in time comprises a pre-determined initial state distribution over the list of possible occupancy states of the area.

According to various implementations, the initial state distribution over the list of possible occupancy states of the area comprises an equal distribution over the list of possible occupancy states of the area.

According to various implementations, the probability distribution over the list of possible occupancy states of the area at the previous point in time is determined based on measurement data related to the area at the previous point in time and a probability distribution over the list of possible occupancy states of the area at a further point in time preceding the previous point in time.

According to various implementations, the probability distribution over the list of possible occupancy states of the area at the pre-determined point in time is determined further based on a transition matrix comprising a plurality of state transition probabilities between possibly occupancy states.

According to various implementations, the following state transition probabilities are different from zero: a state transition probability 302 from the static occupancy state S into the static occupancy state S; a state transition probability 304 from the static occupancy state S into the first uncertainty state SD between the static occupancy state S and the dynamic occupancy state D; a state transition probability 306 from the static occupancy state S into the second uncertainty state SF between the static occupancy state S and the free-space state F; a state transition probability 308 from the dynamic occupancy state D into the dynamic occupancy state D; a state transition probability 310 from the dynamic occupancy state D into the first uncertainty state SD between the static occupancy state S and the dynamic occupancy state D; a state transition probability 312 from the dynamic occupancy state D into the third uncertainty state DF between the dynamic occupancy state D and the free-space state F; a state transition probability 314 from the free-space state F into the free-space state F; a state transition probability 316 from the free-space state F into the second uncertainty state SF between the static occupancy state S and the free-space state F; a state transition probability 318 from the free-space state F into the third uncertainty state DF between the dynamic occupancy state D and the free-space state F; a state transition probability 320 from the first uncertainty state SD between the static occupancy state S and the dynamic occupancy state D into the first uncertainty state SD between the static occupancy state S and the dynamic occupancy state D; a state transition probability 322 from the first uncertainty state SD between the static occupancy state S and the dynamic occupancy state D into the unknown occupancy state SDF; a state transition probability 324 from the second uncertainty state SF between the static occupancy state S and the free-space state F into the second uncertainty state SF between the static occupancy state S and the free-space state F; a state transition probability 326 from the second uncertainty state SF between the static occupancy state S and the free-space state F into the unknown occupancy state SDF; a state transition probability 328 from the third uncertainty state DF between the dynamic occupancy state D and the free-space state F into third uncertainty state DF between the dynamic occupancy state D and the free-space state F; a state transition probability 330 from the third uncertainty state DF between the dynamic occupancy state D and the free-space state F into the unknown occupancy state SDF; a state transition probability 332 from the unknown occupancy state SDF into the unknown occupancy state SDF is equal to 1.

According to various implementations, the transition matrix is dependent of an estimated velocity of an object in the area.

According to various implementations, the probability distribution over the list of possible occupancy states of the area at the pre-determined point in time is determined further based on an observation matrix comprising observation emission probabilities.

According to various implementations, the area comprises a cell of an occupancy grid, the occupancy grid comprising a plurality of further cells.

According to various implementations, the measurement data is determined based on a LIDAR sensor and the measurement data comprises an uncertainty information between a static occupancy and a dynamic occupancy or a free-space information.

According to various implementations, the measurement data is determined based on a radar sensor and the measurement data comprises a static occupancy information, a dynamic occupancy information, an uncertainty information between a static occupancy and a dynamic occupancy, or a free-space information.

According to various implementations, the observation matrix is dependent on at least one of a detection range rate from the radar sensor and a distance from the radar sensor.

Each of the operations 402, 404, 406, and the further operations described above may be performed by computer hardware components. With the methods and systems as described herein, occupancy state detection may be provided.

Figure 5:
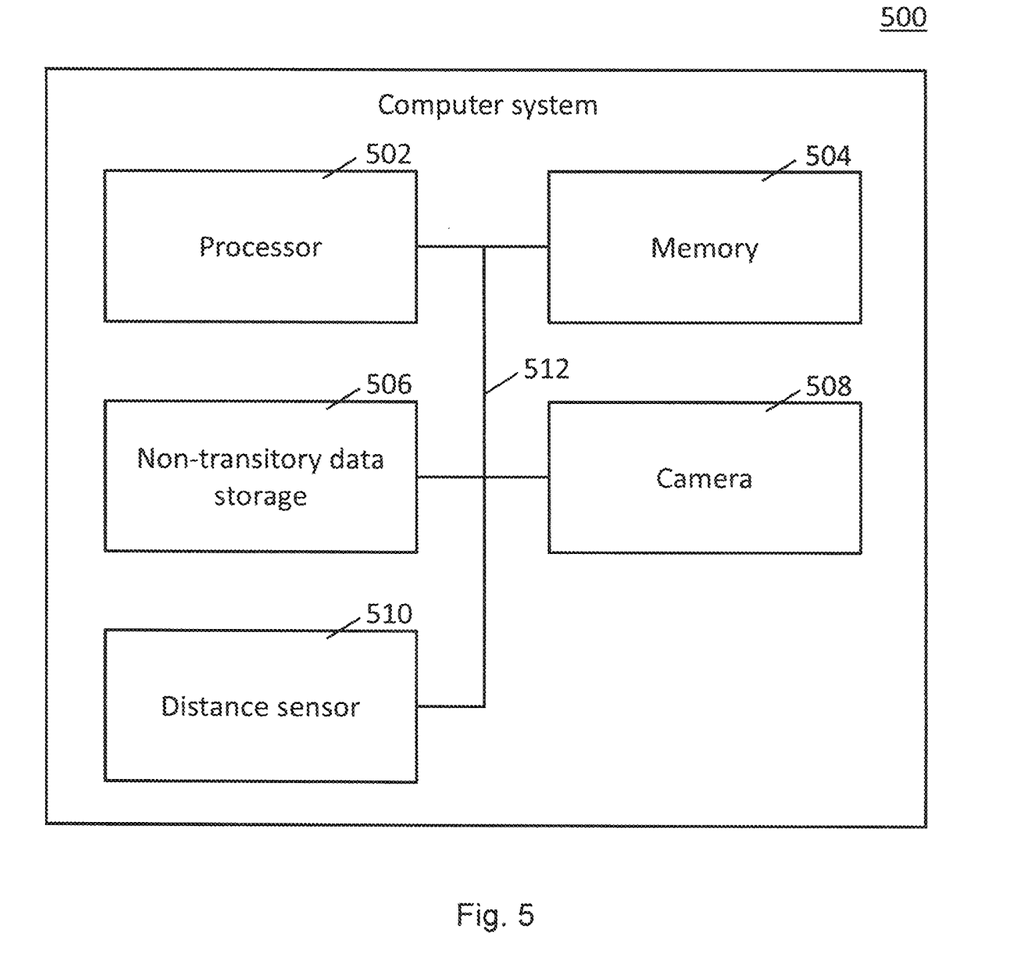
FIG. 5 illustrates a computer system with a plurality of computer hardware components configured to carry out operations of a computer-implemented method for object detection according to various implementations.

FIG. 5 illustrates a computer system 500 with a plurality of computer hardware components configured to carry out operations of a computer-implemented method for occupancy state detection according to various implementations. The computer system 500 may include a processor 502, a memory 504, and a non-transitory data storage 506. A camera 508 and/or a distance sensor 510 (for example a radar sensor or a LIDAR sensor) may be provided as part of the computer system 500 (like illustrated in FIG. 5), or may be provided external to the computer system 500.

The processor 502 may carry out instructions provided in the memory 504. The non-transitory data storage 506 may store a computer program, including the instructions that may be transferred to the memory 504 and then executed by the processor 502. The camera 508 and/or the distance sensor 510 may be used to determine measurement data, for example measurement data related to the area at the pre-determined point in time as described herein.

The processor 502, the memory 504, and the non-transitory data storage 506 may be coupled with each other, e.g., via an electrical connection 512, such as e.g., a cable or a computer bus or via any other suitable electrical connection to exchange electrical signals. The camera 508 and/or the distance sensor 510 may be coupled to the computer system 500, for example via an external interface, or may be provided as parts of the computer system (e.g., internal to the computer system, for example coupled via the electrical connection 512).

The terms "coupling" or "connection" are intended to include a direct "coupling" (for example via a physical link) or direct "connection" as well as an indirect "coupling" or indirect "connection" (for example via a logical link), respectively.

It may be understood that what has been described for one of the methods above may analogously hold true for the computer system 500.

What is claimed is:

1. A method comprising:
    determining a probability distribution over a list of possible occupancy states (S, D, F, SD, SF, DF, SDF) of an area at a previous point in time, the area comprising a cell of an occupancy grid that comprises a plurality of further cells, and the list of possible occupancy states (S, D, F, SD, SF, DF, SDF) comprising:
        a static occupancy state(S), a dynamic occupancy state (D), a free-space state (F), a first uncertainty state (SD) between the static occupancy state(S) and the dynamic occupancy state (D), a second uncertainty state (SF) between the static occupancy state(S) and the free-space state (F), a third uncertainty state (DF) between the dynamic occupancy state (D) and the free-space state (F), and an unknown occupancy state (SDF);
    determining measurement data related to the area at a pre-determined point in time using a sensor;
    using a Hidden Markov Model (HMM), determining a probability distribution over the list of possible occupancy states (S, D, F, SD, SF, DF, SDF) of the area at the pre-determined point in time based on the measurement data and the probability distribution over the list of possible occupancy states (S, D, F, SD, SF, DF, SDF) of the area at the previous point in time; and
    based on the probability distribution of the area at the pre-determined point in time, at least one of (a) planning a path for a robot including avoiding collisions of the robot and (b) detecting objects for driving of a vehicle.

2. The method as described in claim 1, wherein the probability distribution over the list of possible occupancy states (S, D, F, SD, SF, DF, SDF) of the area at the previous point in time comprises a pre-determined initial state distribution over the list of possible occupancy states (S, D, F, SD, SF, DF, SDF) of the area.

3. The method as described in claim 2, wherein the initial state distribution over the list of possible occupancy states (S, D, F, SD, SF, DF, SDF) of the area comprises an equal distribution over the list of possible occupancy states (S, D, F, SD, SF, DF, SDF) of the area.

4. The method as described in claim 1, wherein the probability distribution over the list of possible occupancy states (S, D, F, SD, SF, DF, SDF) of the area at the previous point in time is determined based on measurement data related to the area at the previous point in time and a probability distribution over the list of possible occupancy states (S, D, F, SD, SF, DF, SDF) of the area at a further point in time preceding the previous point in time.

5. The method as described in claim 1, wherein the probability distribution over the list of possible occupancy states (S, D, F, SD, SF, DF, SDF) of the area at the pre-determined point in time is determined further based on a transition matrix comprising a plurality of state transition probabilities between possibly occupancy states (S, D, F, SD, SF, DF, SDF).

6. The method as described in claim 5, wherein the following state transition probabilities are different from zero:
    a state transition probability from the static occupancy state(S) into the static occupancy state(S);
    a state transition probability from the static occupancy state(S) into the first uncertainty state (SD) between the static occupancy state(S) and the dynamic occupancy state (D);
    a state transition probability from the static occupancy state(S) into the second uncertainty state (SF) between the static occupancy state(S) and the free-space state (F);
    a state transition probability from the dynamic occupancy state (D) into the dynamic occupancy state (D);
    a state transition probability from the dynamic occupancy state (D) into the first uncertainty state (SD) between the static occupancy state(S) and the dynamic occupancy state (D);
    a state transition probability from the dynamic occupancy state (D) into the third uncertainty state (DF) between the dynamic occupancy state (D) and the free-space state (F);
    a state transition probability from the free-space state (F) into the free-space state (F);
    a state transition probability from the free-space state (F) into the second uncertainty state (SF) between the static occupancy state(S) and the free-space state (F);
    a state transition probability from the free-space state (F) into the third uncertainty state (DF) between the dynamic occupancy state (D) and the free-space state (F);
    a state transition probability from the first uncertainty state (SD) between the static occupancy state(S) and the dynamic occupancy state (D) into the first uncertainty state (SD) between the static occupancy state(S) and the dynamic occupancy state (D);
    a state transition probability from the first uncertainty state (SD) between the static occupancy state(S) and the dynamic occupancy state (D) into the unknown occupancy state (SDF);
    a state transition probability from the second uncertainty state (SF) between the static occupancy state(S) and the free-space state (F) into the second uncertainty state (SF) between the static occupancy state(S) and the free-space state (F);
    a state transition probability from the second uncertainty state (SF) between the static occupancy state(S) and the free-space state (F) into the unknown occupancy state (SDF);
    a state transition probability from the third uncertainty state (DF) between the dynamic occupancy state (D) and the free-space state (F) into third uncertainty state (DF) between the dynamic occupancy state (D) and the free-space state (F);
    a state transition probability from the third uncertainty state (DF) between the dynamic occupancy state (D) and the free-space state (F) into the unknown occupancy state (SDF); and
    a state transition probability from the unknown occupancy state (SDF) into the unknown occupancy state (SDF) is equal to 1.

7. The method as described in claim 5 wherein the transition matrix is dependent of an estimated velocity of an object in the area.

8. The method as described in claim 1, wherein the probability distribution over the list of possible occupancy states (S, D, F, SD, SF, DF, SDF) of the area at the pre-determined point in time is determined further based on an observation matrix comprising observation emission probabilities.

9. The method as described in claim 1, wherein the measurement data is determined based on a radar sensor and the measurement data comprises at least one of a static occupancy information, a dynamic occupancy information, an uncertainty information between a static occupancy and a dynamic occupancy, or a free-space information.

10. The method as described in claim 1, wherein the observation matrix is dependent on at least one of a detection range rate from the radar sensor or a distance from the radar sensor.

11. The method as described in claim 1, wherein the measurement data is determined based on a light detection and ranging (LIDAR) sensor and the measurement data comprises an uncertainty information between a static occupancy and a dynamic occupancy, or a free-space information.

12. A system comprising:
one or more processors; and
a memory coupled to the one or more processors, the memory storing one or more programs configured to be executed by the one or more processors, the one or more programs including instructions that, when executed by the one or more processors, cause the one or more processors to:
determine a probability distribution over a list of possible occupancy states (S, D, F, SD, SF, DF, SDF) of an area at a previous point in time, the area comprising a cell of an occupancy grid that comprises a plurality of further cells, and the list of possible occupancy states (S, D, F, SD, SF, DF, SDF) comprises:
a static occupancy state(S), a dynamic occupancy state (D), a free-space state (F), a first uncertainty state (SD) between the static occupancy state(S) and the dynamic occupancy state (D), a second uncertainty state (SF) between the static occupancy state(S) and the free-space state (F), a third uncertainty state (DF) between the dynamic occupancy state (D) and the free-space state (F), and an unknown occupancy state (SDF);
determine measurement data related to the area at a pre-determined point in time using a sensor;
using a Hidden Markov Model (HMM), determine a probability distribution over the list of possible occupancy states (S, D, F, SD, SF, DF, SDF) of the area at the pre-determined point in time based on the measurement data and the probability distribution over the list of possible occupancy states (S, D, F, SD, SF, DF, SDF) of the area at the previous point in time; and
based on the probability distribution of the area at the pre-determined point in time, at least one of (a) planning a path for a robot including avoiding collisions of the robot and (b) detecting objects for driving of a vehicle.

13. The system as described in claim 12, further comprising a sensor, the sensor comprising at least one of a light detection and ranging (LIDAR) sensor or a radar sensor.

14. The system as described in claim 13, wherein the system and the sensor are integrated in a vehicle.

15. A non-transitory computer-readable storage medium storing one or more programs comprising instructions, which when executed by a processor, cause the processor to perform operations including:
determining a probability distribution over a list of possible occupancy states (S, D, F, SD, SF, DF, SDF) of an area at a previous point in time, the area comprising a cell of an occupancy grid that comprises a plurality of further cells, and the list of possible occupancy states (S, D, F, SD, SF, DF, SDF) comprises:
a static occupancy state(S), a dynamic occupancy state (D), a free-space state (F), a first uncertainty state (SD) between the static occupancy state(S) and the dynamic occupancy state (D), a second uncertainty state (SF) between the static occupancy state(S) and the free-space state (F), a third uncertainty state (DF) between the dynamic occupancy state (D) and the free-space state (F), and an unknown occupancy state (SDF);
determining measurement data related to the area at a pre-determined point in time using a sensor;
using a Hidden Markov Model (HMM), determining a probability distribution over the list of possible occupancy states (S, D, F, SD, SF, DF, SDF) of the area at the pre-determined point in time based on the measurement data and the probability distribution over the list of possible occupancy states (S, D, F, SD, SF, DF, SDF) of the area at the previous point in time; and
based on the probability distribution of the area at the pre-determined point in time, at least one of (a) planning a path for a robot including avoiding collisions of the robot and (b) detecting objects for driving of a vehicle.

16. The non-transitory computer-readable storage medium of claim 15, wherein the probability distribution over the list of possible occupancy states (S, D, F, SD, SF, DF, SDF) of the area at the previous point in time comprises a pre-determined initial state distribution over the list of possible occupancy states (S, D, F, SD, SF, DF, SDF) of the area.

17. The non-transitory computer-readable storage medium of claim 16, wherein the initial state distribution over the list of possible occupancy states (S, D, F, SD, SF, DF, SDF) of the area comprises an equal distribution over the list of possible occupancy states (S, D, F, SD, SF, DF, SDF) of the area.

18. The non-transitory computer-readable storage medium of claim 15, wherein the probability distribution over the list of possible occupancy states (S, D, F, SD, SF, DF, SDF) of the area at the previous point in time is determined based on measurement data related to the area at the previous point in time and a probability distribution over the list of possible occupancy states (S, D, F, SD, SF, DF, SDF) of the area at a further point in time preceding the previous point in time.

19. The non-transitory computer-readable storage medium of claim 15, wherein the probability distribution over the list of possible occupancy states (S, D, F, SD, SF, DF, SDF) of the area at the pre-determined point in time is determined further based on a transition matrix comprising a plurality of state transition probabilities between possibly occupancy states (S, D, F, SD, SF, DF, SDF).

20. The non-transitory computer-readable storage medium of claim 19, wherein the transition matrix is dependent of an estimated velocity of an object in the area.

* * * * *

UNITED STATES PATENT AND TRADEMARK OFFICE
CERTIFICATE OF CORRECTION

PATENT NO. : 12,241,974 B2  
APPLICATION NO. : 17/749826  
DATED : March 4, 2025  
INVENTOR(S) : Maciej Różewicz et al.

Page 1 of 1

It is certified that error appears in the above-identified patent and that said Letters Patent is hereby corrected as shown below:

On the Title Page

Page 2, Column 1, item (56) Other Publications, Line 9: Delete "Perscription" and insert --Perception--

In the Claims

Column 15, Claim 1, Line 9: delete "state(S)," and insert --state (S),--  
Column 15, Claim 1, Line 11: delete "state(S)" and insert --state (S)--  
Column 15, Claim 1, Line 13: delete "state(S)" and insert --state (S)--  
Column 15, Claim 6, Line 63: delete "state(S)" and insert --state (S)--  
Column 15, Claim 6, Line 63: delete "state(S);" and insert --state (S);--  
Column 15, Claim 6, Line 65: delete "state(S)" and insert --state (S)--  
Column 15, Claim 6, Line 66: delete "state(S)" and insert --state (S)--  
Column 16, Claim 6, Line 2: delete "state(S)" and insert --state (S)--  
Column 16, Claim 6, Line 3: delete "state(S)" and insert --state (S)--  
Column 16, Claim 6, Line 9: delete "state(S)" and insert --state (S)--  
Column 16, Claim 6, Line 20: delete "state(S)" and insert --state (S)--  
Column 16, Claim 6, Line 26: delete "state(S)" and insert --state (S)--  
Column 16, Claim 6, Line 28: delete "state(S)" and insert --state (S)--  
Column 16, Claim 6, Line 31: delete "state(S)" and insert --state (S)--  
Column 16, Claim 6, Line 35: delete "state(S)" and insert --state (S)--  
Column 16, Claim 6, Line 37: delete "state(S)" and insert --state (S)--  
Column 16, Claim 6, Line 40: delete "state(S)" and insert --state (S)--  
Column 17, Claim 12, Line 28: delete "state(S)," and insert --state (S),--  
Column 17, Claim 12, Line 30: delete "state(S)" and insert --state (S)--  
Column 17, Claim 12, Line 33: delete "state(S)" and insert --state (S)--  
Column 18, Claim 15, Line 5: delete "state(S)," and insert --state (S),--  
Column 18, Claim 15, Line 7: delete "state(S)" and insert --state (S)--  
Column 18, Claim 15, Line 9: delete "state(S)" and insert --state (S)--

Signed and Sealed this  
Twenty-second Day of April, 2025

Coke Morgan Stewart  
*Acting Director of the United States Patent and Trademark Office*